(12) United States Patent
Rawlins (10) Patent No.: US 11,134,003 B2
(45) Date of Patent: *Sep. 28, 2021

(54) SYSTEM AND METHOD FOR DISTRIBUTION OF ROUTES IN A TELECOMMUNICATIONS NETWORK

(71) Applicant: Level 3 Communications, LLC, Broomfield, CO (US)

(72) Inventor: Logan Rawlins, Gilbert, AZ (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/869,561

(22) Filed: May 7, 2020

(65) Prior Publication Data

US 2020/0358693 A1 Nov. 12, 2020

Related U.S. Application Data

(60) Provisional application No. 62/846,364, filed on May 10, 2019.

(51) Int. Cl.
| | |
|---|---|
| *H04L 12/715* | (2013.01) |
| *H04L 12/751* | (2013.01) |
| *H04L 12/46* | (2006.01) |
| *H04L 12/703* | (2013.01) |
| *H04L 29/08* | (2006.01) |
| *H04L 12/723* | (2013.01) |
| *H04L 12/755* | (2013.01) |
| *H04L 12/707* | (2013.01) |

(Continued)

(52) U.S. Cl.
CPC .......... *H04L 45/04* (2013.01); *H04L 12/4641* (2013.01); *H04L 45/02* (2013.01); *H04L 45/021* (2013.01); *H04L 45/22* (2013.01); *H04L 45/28* (2013.01); *H04L 45/44* (2013.01); *H04L 45/50* (2013.01); *H04L 45/745* (2013.01); *H04L 69/329* (2013.01)

(58) Field of Classification Search
None
See application file for complete search history.

(56) References Cited

U.S. PATENT DOCUMENTS

| | | | |
|---|---|---|---|
| 2002/0021675 A1* | 2/2002 | Feldmann | H04L 45/00 370/254 |
| 2010/0150020 A1* | 6/2010 | Rosen | H04L 45/28 370/254 |
| 2017/0118112 A1* | 4/2017 | Means | H04L 45/74 |

* cited by examiner

*Primary Examiner* — Christine T Duong (57) ABSTRACT

This disclosure describes systems, methods, and devices related to the distribution of routes in a telecommunications network. A networking device may receive a plurality of routing information from the plurality of edge devices of a telecommunications network, each of the plurality of routing information comprising a local preferred route for a corresponding edge device. The networking device may generate a plurality of routing tables, each of the plurality of routing tables associated with a corresponding edge device of the plurality of edge devices and comprising the local preferred route for the corresponding edge device. The networking device may update the local preferred route of a first routing table of the plurality of routing tables with the local preferred route of a second routing table of the plurality of routing tables. The networking device may transmit, via an internal border gateway protocol (iBGP) session and to the corresponding edge device associated with the first routing table, the updated local preferred route.

17 Claims, 6 Drawing Sheets

(51) Int. Cl.
*H04L 12/721* (2013.01)
*H04L 12/741* (2013.01)

SYSTEM AND METHOD FOR DISTRIBUTION OF ROUTES IN A TELECOMMUNICATIONS NETWORK

CROSS-REFERENCE TO RELATED APPLICATION(S)

This application claims the benefit of U.S. Provisional Application No. 62/846,364, filed May 10, 2019, the disclosure of which is incorporated herein by reference as if set forth in full.

TECHNICAL FIELD

Embodiments of the present invention generally relate to systems and methods for implementing a telecommunications network, and more specifically for distributing routes to routing devices within a network based on one or more network policies.

BACKGROUND

Many telecommunications networks include a process of announcing routing information to devices within and outside the network and then re-broadcasting or announcing the routing information to other devices. Routing information generally provides information as to how to reach a destination device or destination address, whether internal or external to the network. Through this route announcement process, devices within the network receive information on the connectivity of the network by which communication packets may be transmitted. However, the route announcement process may cause undesirable issues for the network, especially for packets intended for border networks or other customers that connect to the network in multiple locations and/or connections.

SUMMARY

A need exists for a route distribution system that distributes routes to routing devices within a network. Accordingly, one implementation of the present disclosure may take the form of a method for operating a telecommunications network using a network device configured to select an updated local preferred route comprising receiving, at the network device, a plurality of routing information from a plurality of edge devices of a telecommunications network, each of the plurality of routing information comprising a local preferred route for a corresponding edge device. The method may include the operations of generating, at the network device, a plurality of routing tables, each of the plurality of routing tables associated with a corresponding edge device of the plurality of edge devices and comprising the local preferred route for the corresponding edge device. The method may include the operations of updating, by the network device, the local preferred route of a first routing table of the plurality of routing tables with the local preferred route of a second routing table of the plurality of routing tables. Further, the method may include the operations of transmitting, via an internal border gateway protocol (iBGP) session and to the corresponding edge device associated with the first routing table, the updated local preferred route. The local preferred route may be selected by a route reflector associated with a first edge device of the plurality of edge devices. The updated local preferred route may supersede the local preferred route. The local preferred route of the first routing table for the corresponding edge device may comprise a first local preferred routing parameter value and the second routing table may comprise a second local preferred routing parameter value larger than the first local preferred routing parameter value. A subset of the plurality of edge devices is associated with a metro of the telecommunications network, the subset of the plurality of edge devices may receive the local preferred route from a route reflector device. The plurality of routing tables are virtual routing and forwarding tables. A first virtual routing and forwarding table may be used for advertising the updated local preferred route to a second virtual routing and forwarding table. The network device may be a traffic control device operated by an administrator.

Another implementation of the present disclosure may take the form of a system for operating a telecommunications network to select an updated local preferred route. The system may receive a plurality of routing information from a plurality of edge devices of a network, each of the plurality of routing information comprising a local preferred route for a corresponding edge device. The system may generate a plurality of routing tables, each of the plurality of routing tables associated with a corresponding edge device of the plurality of edge devices and comprising the local preferred route for the corresponding edge device. The system may update the local preferred route of a first routing table of the plurality of routing tables with the local preferred route of a second routing table of the plurality of routing tables. The system may transmit, via an internal border gateway protocol session and to the corresponding edge device associated with the first routing table, the updated local preferred route. The local preferred route may be selected by a route reflector associated with a first edge device of the plurality of edge devices. The updated local preferred route may supersede the local preferred route. The local preferred route of the first routing table for the corresponding edge device may comprise a first local preferred routing parameter value and the second routing table may comprise a second local preferred routing parameter value larger than the first local preferred routing parameter value. A subset of the plurality of edge devices is associated with a metro of the telecommunications network, the subset of the plurality of edge devices may receive the local preferred route from a route reflector device. The plurality of routing tables are virtual routing and forwarding tables. A first virtual routing and forwarding table may be used for advertising the updated local preferred route to a second virtual routing and forwarding table. The network device may be a traffic control device operated by an administrator.

Yet another implementation of the present disclosure may take the form of a networking device at least one communication port for communication with at least one computing device of a telecommunications network. The networking device may also include at least one memory that stores computer-executable instructions. The networking device may include at least one processor configured to access the at least one memory, wherein the at least one processor is configured to execute the computer-executable instructions to receive a plurality of routing information from a plurality of edge devices of a network, each of the plurality of routing information comprising a local preferred route for a corresponding edge device. The networking device may generate a plurality of routing tables, each of the plurality of routing tables associated with a corresponding edge device of the plurality of edge devices and comprising the local preferred route for the corresponding edge device. The networking device may update the local preferred route of a first routing table of the plurality of routing tables with the local preferred route of a second routing table of the plurality of routing tables. The networking device may transmit, via an internal border gateway protocol session and to the corresponding edge device associated with the first routing table, the updated local preferred route. The local preferred route may be selected by a route reflector associated with a first edge device of the plurality of edge devices. The updated local preferred route may supersede the local preferred route. The local preferred route of the first routing table for the corresponding edge device may comprise a first local preferred routing parameter value and the second routing table may comprise a second local preferred routing parameter value larger than the first local preferred routing parameter value. A subset of the plurality of edge devices is associated with a metro of the telecommunications network, the subset of the plurality of edge devices may receive the local preferred route from a route reflector device. The plurality of routing tables are virtual routing and forwarding tables. A first virtual routing and forwarding table may be used for advertising the updated local preferred route to a second virtual routing and forwarding table. The network device may be a traffic control device operated by an administrator.

DETAILED DESCRIPTION

Aspects of the present disclosure involve systems, methods, and the like, for distributing or otherwise controlling routing information in a telecommunications network.

A customer network typically connects to an IP network via a border network, such as one provided by an Internet Service Provider (ISP). The border network is typically provided and maintained by a business or organization such as a local telephone company or cable company. A border network may connect to a network at multiple ingress/egress points in various geographic locations. Performing changes to routing configuration in a network comprising a plurality of routers cannot be easily automated because the state of the routers in the network must be kept in sync with the configuration changes. If for some reason, the different routers become out of sync, part of the configuration may be left out of the network. Also, every time a router saves a configuration file or commits it, it causes the router to parse the configuration file that is saved.

Networks utilize route reflector devices for re-broadcasting received routes to external networks or customers. Such route reflectors are often configured to only broadcast a preferred or "best" route to other devices for border networks that have several egress routing paths. This may force all traffic from the network to the border network on one route, potentially overloading that route or a device on the route when other open routes may be available. Border gateway protocol (BGP) routing announcements from provider edges to a route reflector may be re-broadcast to other components (e.g., provider edges) of the network such that each component of the network may become aware of the egress ports available for customers or networks connected to the network and how to route packets intended for those connected networks. BGP routing announcement has been used in the past to control certain traffic. This was accomplished by injecting certain types of routes (e.g., /32 prefix routes) to allow customers to choose whichever transit exit route they want to use. However, this is not very efficient and is time-consuming. A /32 prefix is commonly referred to as a host route since it identifies a route to a specific IP host address.

In one or more embodiments, provider edge routes may be taken from every provider edge device and not compared against any other routes. This may raise the local preference of a route to make it a preferred route to force the router, where the route is being set, to add that route to its routing table. This also preserves the BGP next hop that is originating that announcement to other routers. This allows traffic to be directed deliberately to target certain provider edge devices and target certain markets by sending these preferred routes to route reflectors.

Large networks have trouble controlling traffic without performing multiple route modifications. In these large networks, it is typical to implement route reflectors. The use of route reflectors facilitates a full mesh of every single router of a plurality of routers on the network. Those routers communicate every best route for that particular router to every other router on the network. This way, by using route reflectors, every router has a good view of every other router on the network in this type of topology. When router reflectors are introduced in the network, a large number of routes are seen by each router but each provider edge device loses some granularity because the route reflectors, which are implemented above them, make routing decisions when the route reflectors broadcast routes to each provider edge device below them in the network hierarchy. This does not ensure the use of the best route. When there is congestion or failure on the network, traffic would need to be moved to another route. In that case, alternate routes may be selected by the network in response to the congestion or failure at a device or network along the route. The alternate route may be provided to the route reflector device within a network that distributes the route to multiple other devices that are clients to the route reflector. However, because the distribution of the alternate route is provided to the multiple clients at once, control over routes to a specific routing device may not be available.

In one or more embodiments, a traffic controller device may be operated by a network administrator to modify the route as opposed to choosing a preferred or best route, as would be done by a route reflector. A traffic controller device allows an administrator to bypass the routes selected by the route reflectors to be the preferred or best routes. In one way, route granularity may be regained if route reflectors are removed from the network. However, this creates a problem because, without route reflectors, a BGP session would need to be established with each router every time a new router is added to the network.

A route may be set as less preferred (or not best) so that the route reflector that is typically above that router would not select this router when the route reflector announces or broadcasts the next best route. In some embodiments, the next best route may be the closest route or market. For example, if a New York route is set to as less preferred, the next closest route may then be Washington, D.C. Then the route reflector would use Washington, D.C. as the next best route instead of the New York route. This presents a problem because if traffic needs to move to a farther market, an administrator would need to continue to set routes as less preferred until the route gets to that market. Continuing with the above example, if the traffic needs to be routed to Los Angeles, the administrator would continue to de-preference these routes or markets until it reaches Los Angeles.

In one or more embodiments, a route controller may allow the administrator to set a route as a desired route or market as a preferred route. Continuing with the above example, the traffic controller device allows the administrator to directly set Los Angeles to a preferred route as opposed to having to de-preference routes from one market to the next closest market and so on. After the traffic controller device sets Los Angeles as the preferred route, the traffic controller may then be propagate that route to a route reflector, which would then broadcast this route to other routers. This provides an improved network control as opposed to multiple network changes to allow an administrator to set a preferred route.

In one or more embodiments, a traffic controller device may comprise one or more Virtual Routing and Forwarding (VRF) tables, where each VRF table facilitates that each route that is learned and saved in the VRF table to be siloed and not compared to any other routes so that the route can be advertised between two VRFs. That means a VRF acts as a route reflector to each provider edge device and by default, the traffic controller device would advertise this route down to a provider edge device or a route reflector.

In one implementation, a traffic controller device may be included in a telecommunications network to help facilitate the selection of the best route that may be different from what a route reflector has indicated as the best route. The traffic controller device may receive routing tables or other routing information from a plurality of network devices, such as one or more provider edge devices of the network. The routing information of each network device may be received from one or more route reflector devices of the network such that a local preferred route may be associated with a particular metro or locality of the network. The traffic controller device, upon receiving the routing information from the provider edge devices, may generate a routing table associated with each device providing the routing information. For example, the traffic controller may generate and store a first routing table for a first provider edge device based on the routing information provided to the traffic controller from the first provider edge device. The traffic controller may generate and store a second routing table for a second provider edge device based on the routing information provided to the traffic controller from the second provider edge device. In some instances, the routing information from the first provider edge and the second provider edge may be similar as each provider edge may receive the same or similar routing information from a route reflector. In some instances, the routes seen from either provider edge may be different as the routes announce the best external BGP route and best BGP routes unique to that provider edge.

The traffic controller may also provide updates to one or more of the networking devices associated with the controller. For example, a network policy may determine an update to a local preferred route at one of the provider edge devices associated with the traffic controller. The traffic controller may alter or update, at the traffic controller, the routing table associated with the target provider edge device based on the network policy. To update the local preferred route at a particular device, the routing information in the routing table for that device and maintained by the traffic controller may be updated with a new route or new local preferred parameter value. In some instances, the updated routing information may be obtained from another routing table maintained by the traffic controller for a separate provider edge device. The updated routing table may be provided to the corresponding provider edge device through an internal border gateway protocol (iBGP) session between the target provider edge device and the traffic controller. In that case, the updated new route or new local preferred parameter value would supersede the local preferred route at the particular device. The target provider edge device may be a BGP client of the traffic controller device such that routing information at the traffic controller may be provided to the edge device. By updating the routing table at the traffic controller, targeted route updates may be provided to singular devices within the network such that different routing information may be provided to devices that share the same route reflector device. In this manner, routing information and control over routes may be provided within the network and metros or other localities of the network.

In one or more embodiments, a traffic controller device may be implemented in a distributed denial of service (DDoS) attack scenario, where an attacker may attempt to make an online service or website unavailable by flooding it with unwanted traffic from multiple devices. In such a scenario, it is important to handle the attack traffic by isolating it from other traffic. Traditionally, to handle such attack traffic, a network administrator would have to de-preference routes in such a way to route traffic to a next scrubbing center. However, doing so could also overwhelm the next scrubbing center and so on. A traffic controller device may facilitate sending the attack traffic on a specific route to a specific scrubbing center without having to select a route as originally determined by a route reflector. For example, if a scrubbing center gets overwhelmed by the attack traffic, a traffic controller device may allow an administrator to reroute traffic through other routes by instructing provider edge devices to use a specific route as a preferred route to a specific scrubbing center. The selection of which scrubbing center may be based on how much load or other criteria the scrubbing center is experiencing at that time.

Routers typically advertise their best external routes to the rest of the network. A route reflector takes all the routes that it detects from other route reflectors and compares these routes against all the other routes that it detects. Then the route reflector would choose the best route and send that best route to the client device below. The benefit of a traffic controller device is that instead of making policy changes on the route reflector. The role of the route reflector is to send down routes to the client devices below it as fast as possible so that the network is making quick routing decisions. Making numerous policy changes on the route reflector to control traffic causes unwanted routing decision delays.

Figure 1:
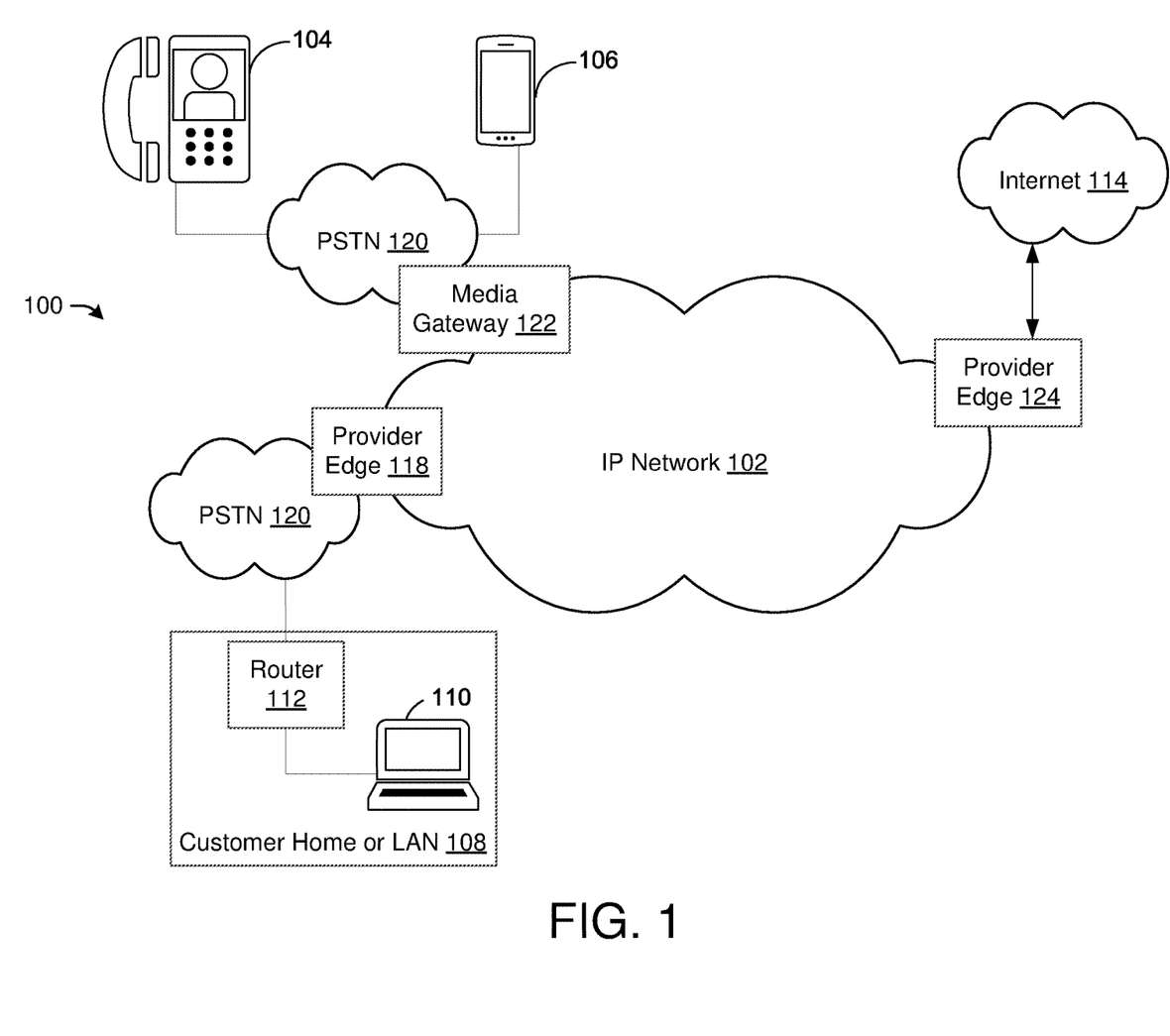
FIG. 1 schematic diagram illustrating an exemplary Internet Protocol (IP) operating environment in accordance with one embodiment.

FIG. 1 illustrates an exemplary operating environment 100 for distributing routes to routing devices within a network based on one or more network policies. In general, the environment 100 provides for establishing communication sessions between network users and for providing one or more network services to network users. For example, users may utilize the network 102 to communicate via the network using communication devices, such as telephone devices 104 and/or mobile communication devices 106. In another example, content from a content delivery network (CDN) may be provided to and/or from one or more customers of the network 102 through the operating environment 100 discussed herein. In still another example, the network environment 100 may facilitate communications between networks managed or administered by separate entities, such as communications between IP network 102 and border network 116. With specific reference to FIG. 1, the environment 100 includes an IP network 102, which may be provided by a wholesale network service provider. However, while the environment 100 of FIG. 1 shows a configuration using the IP network 102, it should be appreciated that portions of the network may include non IP-based routing. For example, network 102 may include devices utilizing time division multiplexing (TDM) or plain old telephone service (POTS) switching. In general, the network 102 of FIG. 1 may include any communication network devices known or hereafter developed.

The IP network 102 includes numerous components such as, but not limited to gateways, routers, route reflectors, and registrars, which enable communication and/or provides services across the IP network 102, but are not shown or described in detail here because those skilled in the art will readily understand these components. The IP network 102 may also include a traffic controller device, discussed in more detail below with reference to FIG. 3 to provide routing information to one or more other components of the network 102. Communications between the IP network 102 and other entities or networks, such as the one or more customer home or business local area networks (LANs) 108, may also be managed through network environment 100.

Customer network 108 can include communication devices such as, but not limited to, a personal computer or a telephone 110 connected to a router/firewall 112. Although shown in FIG. 1 as computer 110, the communication devices may include any type of communication device that receives a multimedia signal, such as an audio, video or web-based signal, and presents that signal for use by a user of the communication device. The communication and networking components of the customer network 108 enable a user at the customer network to communicate via the IP network 102 to other communication devices, such as another customer network and/or the Internet 114. Components of the customer network 108 are typically home- or business-based, but they can be relocated and may be designed for easy portability. For example, the communication device 110 may be wireless (e.g., cellular) telephone, smartphone, tablet or portable laptop computer. In some embodiments, multiple communication devices in diverse locations that are owned or operated by a particular entity or customer may be connected through the IP network 102.

The customer network 108 typically connects to the IP network 102 via a border network 116, such as one provided by an Internet Service Provider (ISP). The border network 116 is typically provided and maintained by a business or organization such as a local telephone company or cable company. The border network 116, also referred to as a peer network, may provide network/communication-related services to their customers. Other communication devices, such as telephonic device 104 and/or mobile device 106, may access and/or be accessed by, the IP network 102 via a public switched telephone network (PSTN) 120 operated by a local exchange carrier (LEC). Communication via any of the networks can be wired, wireless, or any combination thereof. The telephonic device 104, mobile device 106, and/or computing device 110 may further utilize the IP network 102 to communicate with or otherwise access the Internet 114 to provide and obtain data.

Networks, such as the Internet 114, border network 116, and/or PSTN 120, may connect to IP network 102 through one or more interface devices. Interface devices may include, but are not limited to, provider edge devices 118 and 124 and/or provider media gateway device 122. For ease of instruction, only three external networks 114, 116, and 120 are shown communicating with the IP network 102; however, numerous such networks, and other devices, may be connected with the network 102, which is equipped to handle enormous numbers of simultaneous calls and/or other IP-based communications.

The telecommunications network 102 may provide an interface to a customer or border network 116, 120 to connect to the network through a provider edge 118, 124 or media gateway 122. In some instances, a border network 116 may connect to the telecommunications network 102 through more than one provider edge device in multiple locations.

Figure 2:
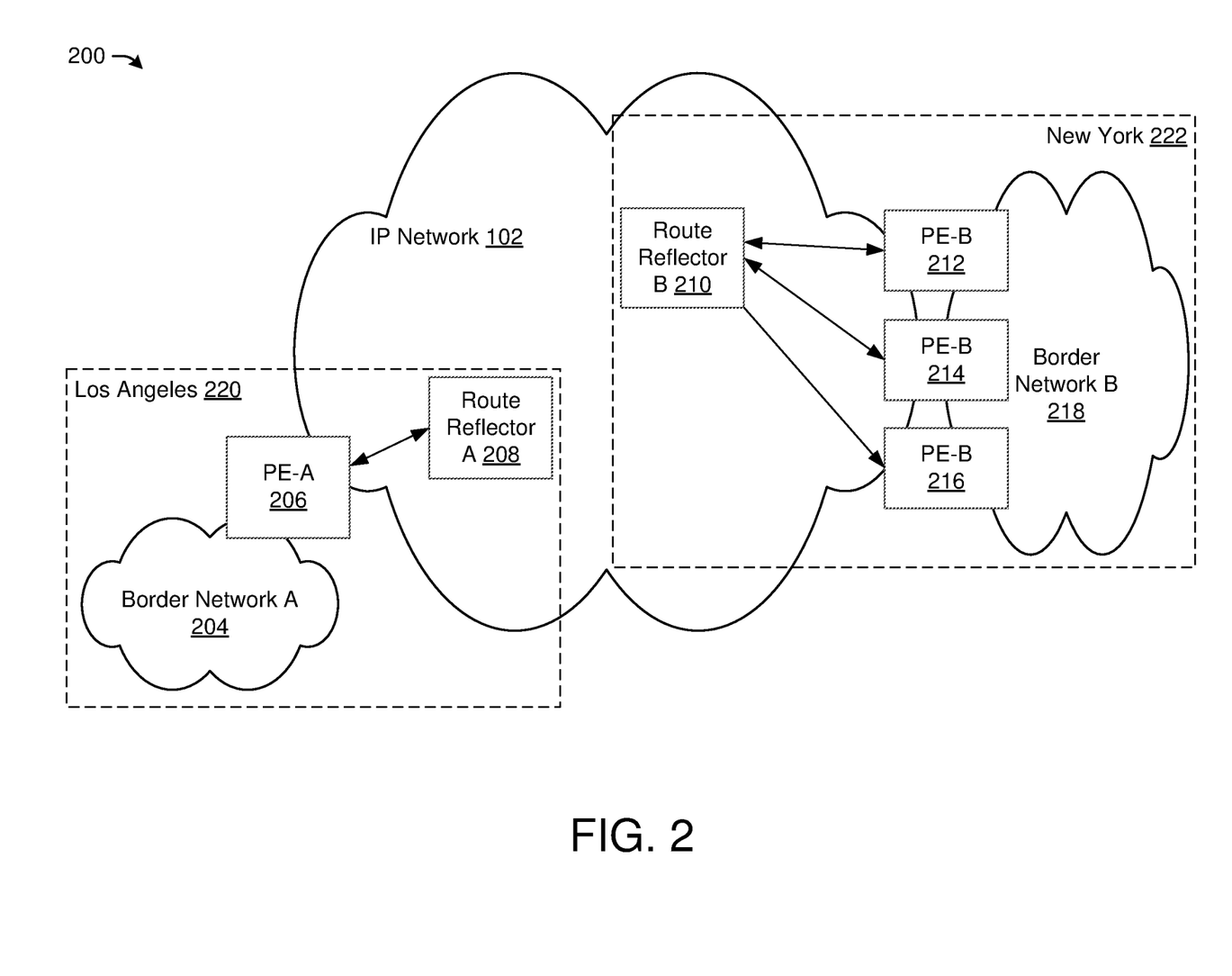
FIG. 2 is a schematic diagram illustrating a network environment to distribute routes of a telecommunications network utilizing one or more route reflector devices.

For example, FIG. 2 is a schematic diagram illustrating a network environment 200 to distribute routes of a telecommunications network utilizing one or more route reflector devices 208, 210. The telecommunications network 202 of FIG. 2 may be similar to that of FIG. 1 such that the networks may include the same or similar components. Further, border networks 204 and 218 connected to the telecommunications network 202 may utilize the network to send and receive packets of information to/from other customers to the network.

As shown in FIG. 2, a border network (border network A 204) connects to the network 202 through a provider edge device (provider edge A 206). Border network B 218 may connect to the network 202 through one or more provider edge devices 212-216. In particular, border network B 218 connects to IP network 202 through provider edge B 212, provide edge C 214, and/or provider edge D 216. In one example, border network A 204 and border network B 218 may be for the same customer to the network 202 such that the border networks may be managed or controlled by the entity and/or share the same autonomous system (AS) number identifying the border network. As such, the particular border network may connect to the telecommunications network 202 at multiple ingress/egress points in various geographic locations. For example, the border network 204 may connect to IP network 202 through provide edge A 206 located in Los Angeles, Calif. Border network B 218 may connect to IP network 202 through provider edge B 212, provider edge C 214, and/or provider edge D 216 located in New York City, N.Y. In other examples, border network A 204 and border network B 218 are separate border networks with different AS identifiers. For the present disclosure, the border networks 204, 218 are considered to include the same AS identifier such that communications intended for a particular client identified by an AS number may be provided to the client at border network A 204 or border network B 218.

The connections between the border network 204, 218 and the network 202 provide multiple routes between the border network and the telecommunications network 202 along which communications or packets may be transmitted. The border network 204, 218 may connect to the network 202 through any number of edge devices in any geographic location (known as "gateways") in which the telecommunications network is present. A gateway may include connection to the network 202 through a single edge device (such as provider edge A 206) or may include connections to the network via multiple provider edge devices (such as provide edge B 212, provider edge C 214, and/or provider edge D 216). Each provider edge device of the telecommunications network 202 may communicate with a similar provider edge device of a corresponding border network 204, 218 to transmit and receive communication packets between the networks. In this manner, a border network 204, 218 may connect to the telecommunications network 202 through several connections in several locations.

In one particular configuration, the network 202 may include one or more route reflector devices or servers, such as route reflector A 208 and/or route reflector B 210. In general, a route reflector 208, 210 is a server that receives an announced route from a telecommunications device and broadcasts the received route to one or more client devices in the network 202. For example, route reflector B 210 may receive announced routes from provider edge B 212 and/or provider edge C 214 and broadcast the received routes to other provider edges (such as provider edge D 216), servers, media gateways, etc. of the network 202. The use of the route reflectors 208, 210 in the network 202 removes the need for each device of the network to communicate its announced route to each of the other devices in the network. Rather, the route reflector 208, 210 announces each received route to each other devices itself so that each device in the network is not tasked with announcing routes to each other device.

In some instances, the route that is received and broadcast by the route reflector 208 is a border gateway protocol (BGP) route announced by the provider edge device of the network 202. In general, BGP information (or BGP session, BGP feed or BGP data) is a table of Internet Protocol (IP) prefixes which designate network connectivity information, such as routes or transmission paths (including next-hop information), network policies and/or rule-sets for transmission along the path, among other information. The BGP feed may also include External Border Gateway Protocol (eBGP) for network connectivity information between different AS networks and/or Interior Border Gateway Protocol (iBGP to IGP) information for network routes within an AS or network. Thus, eBGP information mainly describes routes used by the network 202 to connect to external networks or customers (such as border networks 204, 218) while IGP information describes routes within the network 202 to connect one provider edge (such as provider edge A 206) to another provider edge (such as provider edge B 212) through a telecommunications network.

One or more of the components of the network 202 may announce, through a BGP session, those routes that may be serviced by that component. For example, PE-B 212 may provide a BGP announcement that indicates which networks (such as border network 218) that may be accessed through PE-B. Thus, the BGP announcement for PE-B 212 may include a path and next-hop information that designates a route along which packets may be transmitted or received from the connected networks (such as border network 218). The next-hop information generally identifies a particular device of the network 202 through which a destination device or address is available. For example, a particular Internet Protocol (IP) address associated with a customer of the network 202 or border network 218 may be announced from a device of the border network 218 to PE-B 212. PE-B 212 may receive the IP address and announce the address to route reflector B 210 to indicate that communication packets intended for that IP address or destination device of the border network 218 may be processed through PE-B 212 to reach the intended destination. The BGP announcements from the provider edges to the route reflector 210 may be re-broadcast to other components of the network 202 such that each component of the network 202 may become aware of the egress ports available for customers or networks connected to the network 202 and how to route packets intended for those connected networks.

In many cases, a border network may connect to the IP network 202 through multiple connection points to optimize traffic, scale the network, and/or provide geographic separation. For example, border network A 204 and border network B 218 of FIG. 2 may be managed by the same entity and have the same AS. However, the AS may connect to the IP network 202 in Los Angeles 220 through provider edge A 206 and in New York 222 through provider edge B 212, provider edge C 214, and provider edge D 216. In general, communications intended for the border network 204, 218 are provided to the border network via the nearest egress point in the network 202. For example, communications intended for the border network 204, 218 that is received at the IP network 202 in or near New York 222 would egress the network via on the provider edges 212-216 in the New York area. Similarly, communications intended for the border network 204, 218 that is received at the IP network 202 in or near Los Angeles 220 would egress the network via on the provider edge A 206 in the Los Angeles area.

The network 202 may designate a "preferred" or "best" route to route communications intended for the border network 204, 218 via the nearest egress point. The preferred route may be determined by any device of the network 202, such as the route reflector 208, 210 or the provider edge 206, 212-216. For example, once BGP information is received, the device may execute a selection process to determine which route to utilize to transmit a received communication packet to a destination device or address. In one embodiment, the route selection process executed by the device selects the best BGP path for reaching a destination based on one or more of shortest distance, transmission cost, closest egress, and the like. For networks 202 that include a route reflector 208, 210 device, the route reflector may calculate the best path and provide the selected route to the client devices of the reflector. For example, a border network 204, 218 may have multiple connections to the network 202. In the example illustrated in FIG. 2, route reflector B 210 receives BGP routing information for border network 218 from provider edge B 212 and provider edge C 214 as that particular border network is connected to the illustrated edge devices. Similarly, route reflector A 208 receives BGP routing information for border network 204 from provider edge A 206. Route reflector B 210 may select the best route for providing communications to border network B 218. For example, route reflector B 210 may select provider edge B 212 as the best egress route to reach border network B 218. Thus, the local preferred route in New York 222 for border network B 218 is via provider edge B 212. This preferred route may be transmitted to other devices in the network 202, including provider edge C 214 and provider edge D 216. The other devices within the network 202 may store the preferred route as the best egress route for use in routing communications to border network B 218 in New York 222. Similarly, route reflector A 208 may select a best route for providing communications to border network A 204 in Los Angeles 220 (even though border network A 204 and border network B 218 are the same AS network) such that the local preferred route in Los Angeles for border network A 204 is via provider edge A 206. Thus, devices in the network 202 within a metro or locality may receive a single routing path through one of the possible multiple egress ports to the connected border network, even though multiple egress paths or routes are available.

The selection of a local preferred best path may be based on any performance metric, topology, or business consideration of the network 202 and/or border network 218. For example, the border network 218 may provide a preferred ingress route into the network that the route reflector 210 may utilize as the local preferred best route. In another example, the IP network 202 may determine a current load or the presence of an alert or failure along a route to determine the local preferred route to a border network 218. Once a preferred route is determined, the route reflector 210 may broadcast the preferred route with one or more parameters that identify the route as the preferred route. For example, the route reflector 210 may set a local preference parameter of the BGP information that the corresponding provider edges 212-216 may utilize to determine the next-hop when routing a received communication. A network device may execute a route decision tree when determining a route for transmitting a received communication. The decision tree may include an operation to evaluate a local preferred route as indicated by the local preferred route parameter. In one example, the local preferred route parameter may be set at a value of "86". Routes in the routing table with a higher local preferred route parameter value may be selected before routes with a lower local preferred route parameter value. Thus, routes to border network B 218 with a local preferred route parameter less than 86 may not be selected by a routing device when routing to border network B 218, although such routes may be included in the routing table for that device. In this manner, the routing table may indicate local preferred routes for particular destinations.

The use of route reflectors 208, 210 within the network 202 may reduce the number of routes stored by each device of the network 202. However, control over individual routes through the network may be lost. For example, an administrator for network 202 may configure route reflector B 210 to select a different local preferred route to border network B 218, such as through provider edge C 214. However, this new preferred route may be provided to each device that is a client of the route reflector 210 such that the best route is changed for each device within the metro or network area. In other words, each provider edge (provider edges 212-216) in the New York locality 222 may receive the new preferred route from the route reflector 210 such that route configuration at any particular provider edge device may not be available to the network administrator. In some instances, it may be advantageous to control routes at particular devices, such as a particular provider edge of the network 202. For example, a customer may request communications received at provider edge D 216 egress the network 202 in Los Angeles 220 through provider edge A 206. As provider edge D 216 includes the local preferred route via provider edge B 212, the network administrator may not be able to fulfill the customer request. Because a route reflector will make a route selection and send that route to the devices below it. Alternatively, the preferred route may be configured by the administrator, but the new preferred route via provider edge A 206 in Los Angeles 220 may be provided to each provider edge 212-216 in New York 222 by route reflector B 210 such that each provider edge may begin transmitting communications through provider edge A 206.

To provide route control over individual devices within a network 202 that utilizes route reflectors 208, 210, a traffic controller device may be included in the network.

Figure 3:
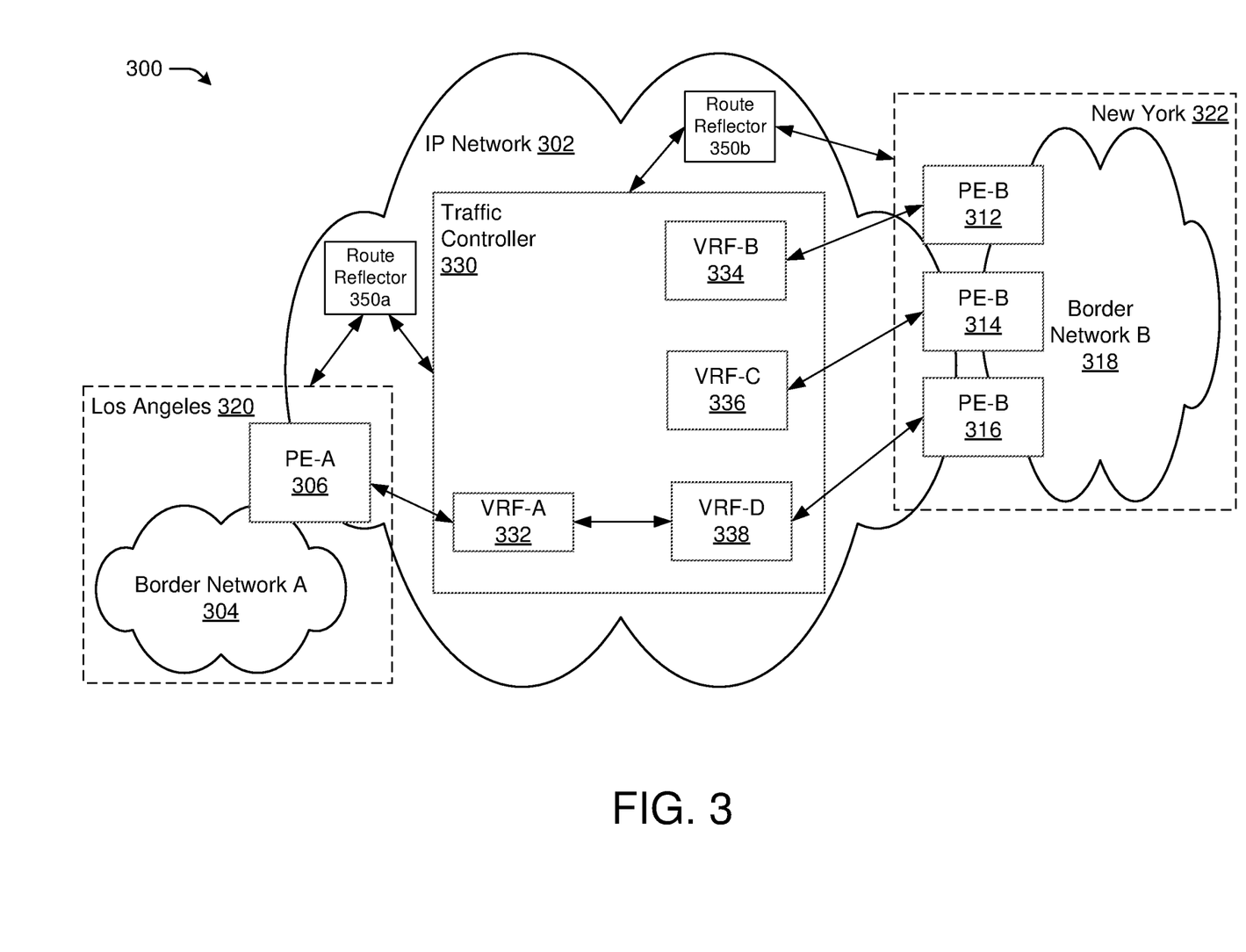
FIG. 3 is a schematic diagram illustrating a network environment to distribute routes of a telecommunications network utilizing a traffic or route controller device.

FIG. 3 is a schematic diagram illustrating a network environment 300 to distribute routes of a telecommunications network utilizing a traffic or route controller device 330.

Many of the components of the network environment 300 are similar to those discussed above. For example, border network A 304 may connect to IP network 302 via provider edge A 306 in the Los Angeles area 320. Border network B 318 may connect to network 302 via provider edge 312, provider edge C 314, and/or provider edge D 316 in the New York area 322. Further, although not illustrated in FIG. 3, the network 302 may include route reflector devices as discussed above to select and provide best or preferred routes to the provider edges of the network 302.

The use of route reflectors (e.g., route reflectors 350a and 350b) facilitates a full mesh of every single router of a plurality of routers (e.g., provider edges 306, 312-316 of the network 302). Those routers communicate every best route for that particular router to every other router on the network. This way, by using route reflectors, every router has a good view of every other router on the network in this type of topology. When route reflectors are introduced in the IP network 302, a large number of routes are seen by each provider edge device but each provider edge device loses some granularity because the route reflectors, which are implemented above them, make routing decisions when the route reflectors broadcast routes to each provider edge device below them in the network hierarchy.

The network 302 of FIG. 3 may include a traffic controller device 330 to distribute routes to one or more other devices of the network 302. The traffic controller 330 may be embodied on a single device or multiple devices within the network 302. For example, the traffic controller 330 may be an application server or other routing device of the network 302 configured to operate as described herein. In general, the traffic controller 330 may receive routing information from one or more other devices within the network 302, store the routing information in a separate routing table for each reporting device, and provide particular routing information to one or more of the reporting devices. As explained in more detail below, the traffic controller 302 may thus be configured. one or more devices, such as the provider edges 306, 312-316 of the network 302 with particular routes that may override a preferred route received through a BGP session or from a route reflector device (e.g., route reflector devices 350a and 350b). The traffic controller device 330 may allow a network administrator to update a preferred route as opposed to choosing the most direct route using the preferred route received through the BGP session, as may be selected by a route reflector device. A traffic controller device 330 allows an administrator to bypass the preferred routes selected by the route reflector devices 350a and 350b.

As discussed above, provider edges 306, 312-316 of the network 302 may receive BGP or other routing information from a route reflector or other routing devices of the network. Each provider edge 306, 312-316 may store the received routing information in a routing table for use in routing received communications. In addition, each provider edge device 306, 312-316 may be configured to provide the corresponding routing tables to the traffic controller 330 of the network 302. The traffic controller device we 30 may comprise one or more Virtual Routing and Forwarding (VRF) tables, where each VRF table allows each route that is learned and saved in the VRF table to be siloed and not compared to any other routes so that the route can be only advertised between two VRF tables. That means a VRF table acts as a route reflector device to each provider edge device such that the traffic controller 330 advertises this route down to a provider edge device or a route reflector. The traffic controller 330 may store each received routing table in a corresponding Virtual Routing and Forwarding (VRF) table. For example, the traffic controller 330 may store the routing table for provider edge A 306 in a VRF table A 332, the routing table for provider edge B 312 in a VRF table B 334, the routing table for provider edge C 314 in a VRF table C 338, and the routing table for provider edge D 316 in a VRF table D 338. Other provider edges and/or other devices of the network 302 may also provide routing tables to and stored in a VRF table by the traffic controller 330. The VRF tables 332-338 corresponding to the provider edges 306, 312-316 may be logically separated at the traffic controller 330 such that the routing tables are not combined or reduced. Further, the traffic controller 330 may not determine or select the best route or path for a particular device. Rather, the traffic controller 330 may store a copy of the routing table maintained for each device that is a client of the traffic controller.

In embodiments of the network 302 that include route reflectors, the routing tables received from the provider edges 306, 312-316 may include the best routes or local preferred routes as determined by the route reflectors, as discussed above. For example, each provider edge 312-316 in the New York area 322 may include a preferred route via provider edge B 312 to border network B 318. This local preferred route may be provided to the provider edges 312-316 from a route reflector, as discussed above. Similarly, the routing table for provider edge A 306 may include a local preferred route via provider edge A 306 in Los Angeles 320 to reach border network A 304. The local preferred route for each provider edge 306, 312-316 may be stored in the corresponding VRF 332-338 maintained by the traffic controller 330.

As discussed above, a network administrator may override a preferred route or other announced route at a device of the network 302. For example, an administrator of border network B 318 may request that communications received at provider edge D 316 be egressed via provider edge A 306 in Los Angeles 320. In another example, a network administrator of network 302 may load balance communications in the New York area 322 by directing communications from provider edge D 316 to provider edge A 306. The load balancing may occur based on one or more measured performance metrics of the network 302, such as congestion at preferred egress point provider edge B 312.

To override a preferred route or otherwise configured a routing table for a particular device within the network 302, the traffic controller 330 may be configured to alter one or more of the stored VRF 332-338 of the device. For example, a network administrator may alter the local preferred route at provider edge D 316 from via provider edge B 312 (as received from the route reflector for the New York area 322) to a route via provider edge A 306 in Los Angeles 320. Altering the local preferred route at the route reflector would change the routing tables for all provider edges that are clients of the route reflector, such as provider edge B 312 and provider edge C 314. Through the traffic controller 330, however, the local preferred route may be altered for provider edge D 316 only. In one implementation, the traffic controller 330 may be configured to leak or otherwise provide the local preferred route via provider edge A 306 from VRF A 332 associated with provider edge A to VRF D 338 associated with provider edge D 316. The leaked route may include a parameter associated with a route that indicates the local preference for that route. For example, the route to border network B 318 provided to VRF D 338 may include a local preferred route parameter that is higher than other routes to the border network B 318. Provider edge D 316 may, when intending to route a received communication to border network B 318, store the route to border network B with the highest local preferred route parameter. In this manner, the leaked route may become the preferred local route to border network B for provider edge D 316 of the network 302. In general, any parameter of the route in the routing table for a device may be utilized to indicate a preference for a particular route. In some implementations, a network administrator may access one or more of the VRF 332-338 maintained by the traffic controller 330 to configure the VRF with a preferred or alternate route. In this manner, one or more routes in a VRF associated with a component or device of the network 302 may be altered by the traffic controller 330.

The routes of the VRF (such as VRF-D 338) may be provided to the corresponding network device (such as provider edge D 316). For example, the provider edges 306, 312-316 associated with the traffic controller 330 may be clients of the traffic controller such that routing information or tables maintained by the traffic controller may be provided to the client devices. Provider edge D 316 may thus receive the routing information included in VRF-D 338, provider edge C 336 may receive routing information included in VRF-C 336, etc. Further, the routing information received from the traffic controller 330 may supersede or override the routing information received from a route reflector device. For example, provider edge D 316 may receive routing information from a route reflector device, as explained above with relation to FIG. 2. This routing information may designate a local preferred route to border network B 318 via provider edge B 312 such that communications received at provider edge D 316 intended for border network B 318 may thus be routed via provided edge B 312 based on the routing information received from the route reflector. To override the route information provided by the route reflector, the VRF 338 at the traffic controller 330 associated with provider edge D 316 may be altered with a different local preferred route via provider edge A 306. The altered route may be transmitted to provider edge D 316 and installed in the routing table for the provider edge. The provider edge 316 may then transmit communications for the border network via provider edge A 306 as the local preferred route.

Further, the routing information for provider edge B 312 and provider edge C 314 may not be altered by the change to the routing information for provider edge D 316. For example, the routing information stored at provider edge B 312 and provider edge C may include the local preferred route via provider edge B 312 received during the BGP session with the route reflector or other network device. The change of the local preferred route via the provider edge A 306 may only be altered for provider edge D 316. Thus, the traffic controller 330 may provide for alterations in routing information for individual devices associated with the network 302 while retaining the original routing information for other devices in the same metro.

In one or more embodiments, the traffic controller device 330 may be implemented in a distributed denial of service (DDoS) attack scenario, where an attacker may attempt to make an online service or website unavailable by flooding it with unwanted traffic from multiple devices. In such a scenario, it is important to handle the attack traffic by isolating it from other traffic. Traditionally, to handle such attack traffic, a network administrator would have to de-preference routes in such a way to route traffic to a next scrubbing center. However, doing so could also overwhelm the next scrubbing center and so on. A traffic controller device 330 may facilitate sending the attack traffic to a specific route to a specific scrubbing center without having to select a route as originally determined by a route reflector. For example, if a scrubbing center gets overwhelmed by the attack traffic, a traffic controller device may allow an administrator to reroute traffic through other routes by instructing provider edge devices to use a specific scrubbing center. The selection of which scrubbing center may be based on how much load or other criteria the scrubbing center is experiencing at that time.

Figure 4A:
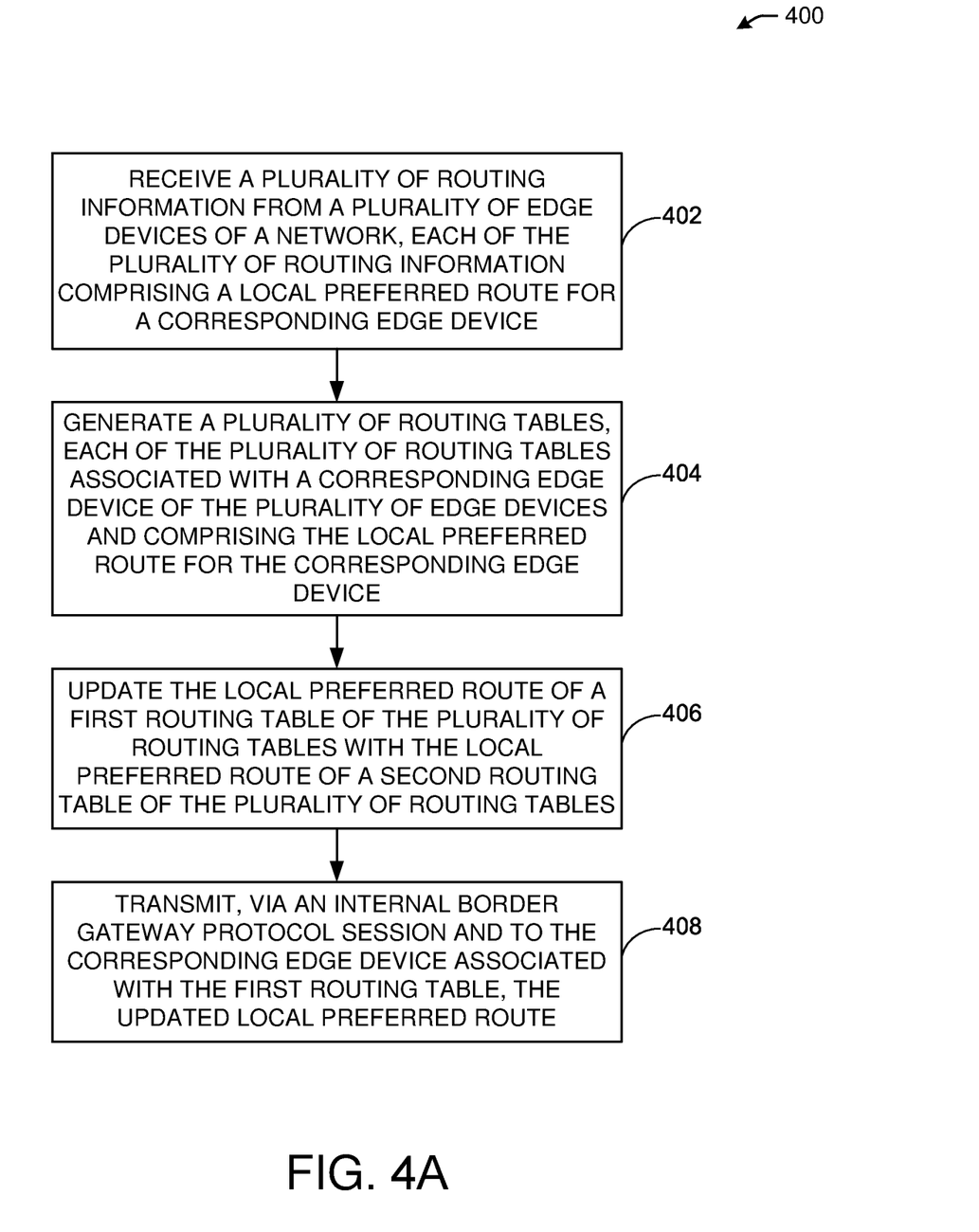
FIG. 4A is a flowchart illustrating a process for a component of a telecommunications network to distribute a route to a routing device of the network.

FIG. 4A is a flowchart illustrating a process 400 for a component of a telecommunications network to select an updated local preferred route and distribute the updated local preferred route to a routing device (e.g., a provider edge) of the network. The operations of the process 400 of FIG. 4A may be performed or executed by the traffic controller device 330 of the network environment 300 of FIG. 3 discussed above. The operations may be performed by one or more hardware components, the execution of one or more software instructions, or a combination of both hardware components and software components. In general, any component or combination of components of the telecommunications network 302, including and separate from the traffic controller device 330, may perform one or more of the operations of the process 400 of FIG. 4A.

At block 402, the traffic controller 330 may receive BGP or other routing information from one or more devices of the network. The routing information may comprise a local preferred route, which may be selected by a route reflector associated with an edge device of a plurality of edge device. Some of the edge devices may be associated with a metro of the telecommunications network, these edge devices may receive the local preferred route from a route reflector device. In one implementation, the traffic controller 330 receives the BGP routing information from a provider edge device of the network 302 or a route reflector. Other devices, such as other provider edges or other route reflectors, of the network 302 may also provide BGP information to the traffic controller 330.

At block 404, the traffic controller 330 may create one or more virtual routing and forwarding (VRF) tables for storing routing information. Each of the VRF tables may correspond to a network device from which the routing information was received such that the traffic controller 330 may store any number of VRF tables for corresponding network devices. The VRF table of the traffic controller 330 may include an indication of the network device to which the table corresponds. The VRF table may comprise the local preferred route for a corresponding network device.

At block 406, the traffic controller 330 may store or update a VRF table for a networking device with a local preferred route or other routing information. For example, the traffic controller 330 may provide routing information to a VRF table that includes a local preferred route parameter value. The local preferred route parameter may indicate which route of multiple routes in the routing table is the local preferred route to reach a particular destination. In one implementation, the routing information updated into the VRF table may include an updated local preferred route. The routing information may be updated by the traffic controller 330 may be provided from another VRF table maintained by the traffic controller for a separate network device. The updated local preferred route replaces or supersedes the local preferred route. The routing information updated into the VRF table may be based on a network policy decision determined by the traffic controller or a network administrator and executed via the traffic controller. In one example, the local preferred route of the first routing table for a corresponding edge device may comprise a first local preferred routing parameter value and a second routing table may comprise a second local preferred routing parameter value larger than the first local preferred routing parameter value.

At block 408, the updated VRF information or table may be transmitted to the corresponding network device. The routing information may be transmitted through a BGP session between the traffic controller 330 and the corresponding network device. The network device may be a BGP client device of the traffic controller 330 such that updates to the VRF table may be transmitted to the network device through the BGP session. In this manner, the traffic controller 330 may create, update, or determine routing information for a particular network device and provide the routing information to the network device. The network device may store the updated routing information in a routing table for use when communications are received at the network device. Through the traffic controller 330, updates to a routing table of a particular network device may occur without updating other neighboring network devices in the same metro or locality. It is understood that the above descriptions are for purposes of illustration and are not meant to be limiting.

Figure 4B:
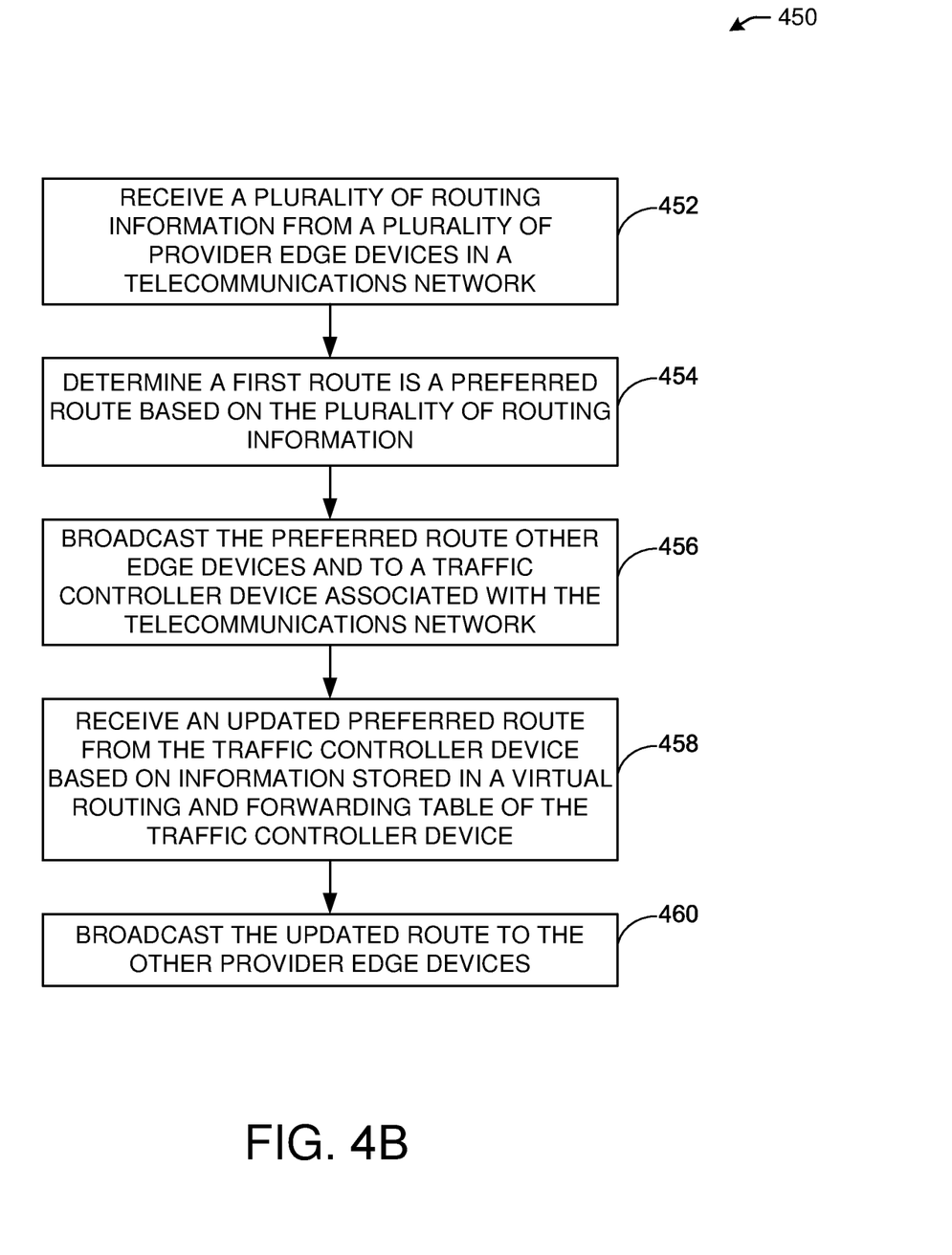
FIG. 4B is a flowchart illustrating a process for a component of a telecommunications network to distribute a route to a routing device of the network.

FIG. 4B is a flowchart illustrating a process 450 for a component of a telecommunications network to select an updated local preferred route and distribute the updated local preferred route to a routing device (e.g., a provider edge) of the network. The operations of the process 450 of FIG. 4B may be performed or executed by one of a provider edge (e.g., provider edges 306, 312-316), a route reflector (e.g., route reflectors 350a and 350b) or a traffic controller device 330 of the network environment 300 of FIG. 3 discussed above. The operations may be performed by one or more hardware components, the execution of one or more software instructions, or a combination of both hardware components and software components. For simplicity, the operations are shown in this process 450 to be operated by a route reflector provisioned to be at a higher level than a provider edge.

At block 452, the route reflector may receive a plurality of routing information from a plurality of provider edge devices in a telecommunications network. The routing information may comprise one more local preferred routes associated with the plurality of provider edge devices.

At block 454, the route reflector may determine a first route is a preferred route based on the plurality of routing information. The preferred route may be selected by the route reflector associated with an edge device of the plurality of edge device. Some of the edge devices may be associated with a metro of the telecommunications network.

At block 456, the route reflector may broadcast the preferred route other edge devices and to a traffic controller device associated with the telecommunications network. The plurality of provider edge devices may receive the local preferred route from the route reflector device.

At block 458, the route reflector may receive an updated preferred route from the traffic controller device based on information stored in a virtual routing and forwarding table of the traffic controller device. The traffic controller may create one or more virtual routing and forwarding tables for storing routing information. Each of the VRF tables may correspond to a network device from which the routing information was received such that the traffic controller may store any number of VRF tables for corresponding network devices. The VRF table of the traffic controller may include an indication of the network device to which the table corresponds. The VRF table may comprise the local preferred route for a corresponding network device. The traffic controller may store or update a VRF table for a networking device with a local preferred route or other routing information. For example, the traffic controller may provide routing information to a VRF table that includes a local preferred route parameter value. The local preferred route parameter may indicate which route of multiple routes in the routing table is the local preferred route to reach a particular destination. In one implementation, the routing information updated into the VRF table may include an updated local preferred route. The routing information may be updated by the traffic controller 330 may be provided from another VRF table maintained by the traffic controller for a separate network device. The updated local preferred route replaces or supersedes the local preferred route. The routing information updated into the VRF table may be based on a network policy decision determined by the traffic controller or a network administrator and executed via the traffic controller. In one example, the local preferred route of the first routing table for a corresponding edge device may comprise a first local preferred routing parameter value and a second routing table may comprise a second local preferred routing parameter value larger than the first local preferred routing parameter value. The traffic controller may create, update, or determine routing information for a particular network device and provide the routing information to the network device. The network device may store the updated routing information in a routing table for use when communications are received at the network device. Through the traffic controller, updates to a routing table of a particular network device may occur without updating other neighboring network devices in the same metro or locality.

At block 460, the route reflector may broadcast the updated route to the other provider edge devices.

It is understood that the above descriptions are for purposes of illustration and are not meant to be limiting.

Figure 5:
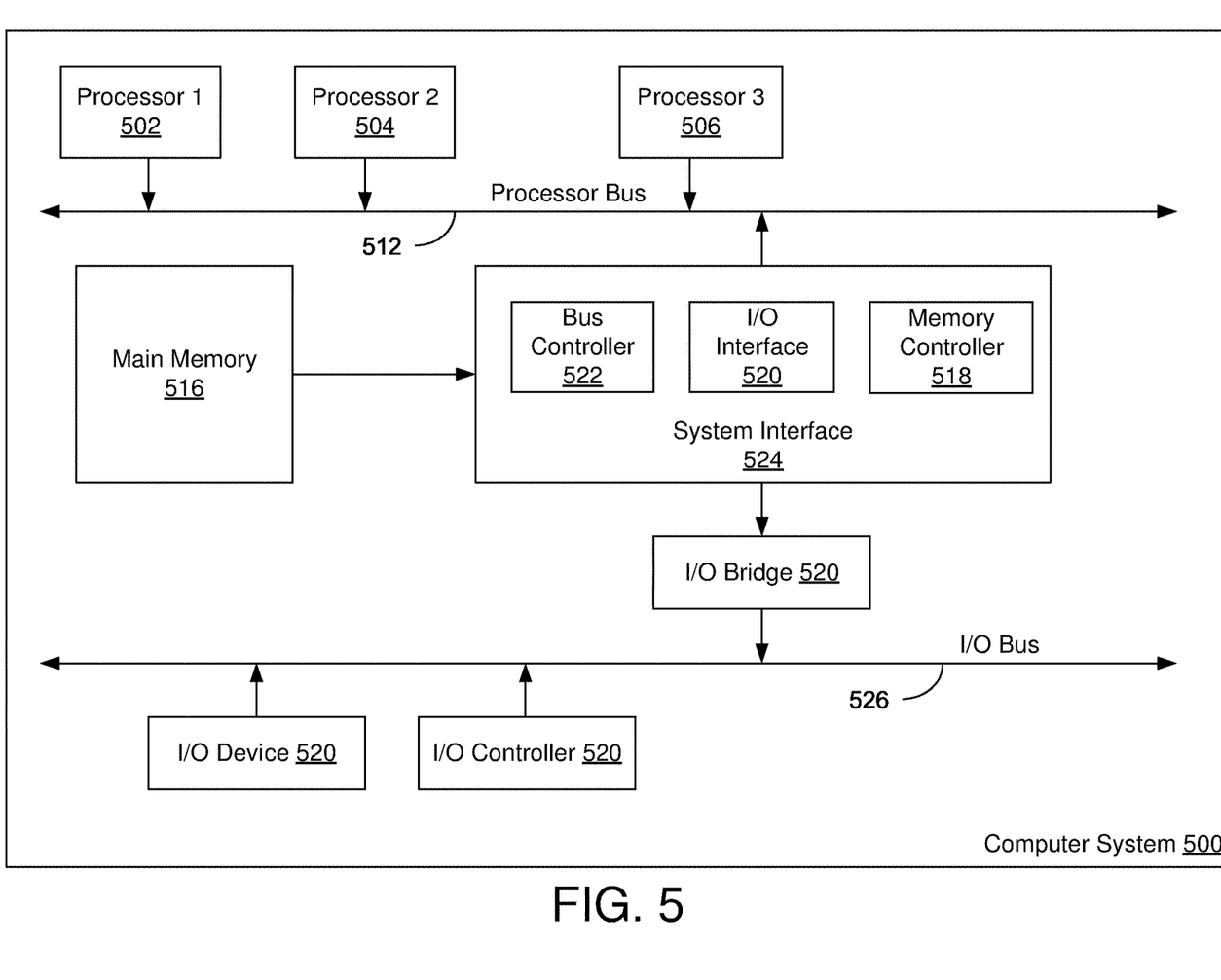
FIG. 5 is a diagram illustrating an example of a computing system that may be used in implementing embodiments of the present disclosure.

FIG. 5 is a block diagram illustrating an example of a computing device or computer system 500 which may be used in implementing the embodiments of the components of the network disclosed above. For example, the computing system 500 of FIG. 5 may be the traffic controller device discussed above. The computer system (system) includes one or more processors 502-506. Processors 502-506 may include one or more internal levels of cache (not shown) and a bus controller or bus interface unit to direct interaction with the processor bus 512. Processor bus 512, also known as the host bus or the front side bus, may be used to couple the processors 502-506 with the system interface 514. System interface 514 may be connected to the processor bus 512 to interface other components of the system 500 with the processor bus 512. For example, system interface 514 may include a memory controller 514 for interfacing a main memory 516 with the processor bus 512. The main memory 516 typically includes one or more memory cards and a control circuit (not shown). System interface 514 may also include an input/output (I/O) interface 520 to interface one or more I/O bridges or I/O devices with the processor bus 512. One or more I/O controllers and/or I/O devices may be connected with the I/O bus 526, such as I/O controller 528 and I/O device 530, as illustrated.

I/O device 530 may also include an input device (not shown), such as an alphanumeric input device, including alphanumeric and other keys for communicating information and/or command selections to the processors 502-506. Another type of user input device includes cursor control, such as a mouse, a trackball, or cursor direction keys for communicating direction information and command selections to the processors 502-506 and for controlling cursor movement on the display device.

System 500 may include a dynamic storage device, referred to as main memory 516, or a random access memory (RAM) or other computer-readable devices coupled to the processor bus 512 for storing information and instructions to be executed by the processors 502-506. Main memory 516 also may be used for storing temporary variables or other intermediate information during execution of instructions by the processors 502-506. System 500 may include a read only memory (ROM) and/or other static storage device coupled to the processor bus 512 for storing static information and instructions for the processors 502-506. The system outlined in FIG. 5 is but one possible example of a computer system that may employ or be configured in accordance with aspects of the present disclosure.

According to one embodiment, the above techniques may be performed by computer system 500 in response to processor 504 executing one or more sequences of one or more instructions contained in main memory 516. These instructions may be read into main memory 516 from another machine-readable medium, such as a storage device. Execution of the sequences of instructions contained in main memory 516 may cause processors 502-506 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 606 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 516, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

What is claimed:

1. A method for operating a telecommunications network using a network device configured to select an updated local preferred route, the method comprising:
   receiving, at the network device, a plurality of routing information from a plurality of edge devices of a telecommunications network, each of the plurality of routing information comprising a local preferred route for a corresponding edge device;
   generating, at the network device, a plurality of routing tables, each of the plurality of routing tables associated with a corresponding edge device of the plurality of edge devices and comprising the local preferred route for the corresponding edge device;
   updating, by the network device, the local preferred route of a first routing table of the plurality of routing tables with the local preferred route of a second routing table of the plurality of routing tables; and
   transmitting, via an internal border gateway protocol (iBGP) session and to the corresponding edge device associated with the first routing table, the updated local preferred route,
   wherein the local preferred route of the first routing table for the corresponding edge device comprises a first local preferred routing parameter value and the second routing table comprises a second local preferred routing parameter value larger than the first local preferred routing parameter value.

2. The method of claim 1, wherein the local preferred route is selected by a route reflector associated with a first edge device of the plurality of edge devices.

3. The method of claim 1, wherein the updated local preferred route supersedes the local preferred route.

4. The method of claim 1, wherein a subset of the plurality of edge devices is associated with a metro of the telecommunications network, the subset of the plurality of edge devices receives the local preferred route from a route reflector device.

5. The method of claim 1, wherein the plurality of routing tables are virtual routing and forwarding tables.

6. The method of claim 1, wherein a first virtual routing and forwarding table is used for advertising the updated local preferred route to a second virtual routing and forwarding table.

7. The method of claim 1, wherein the network device is a traffic control device operated by an administrator.

8. A system for operating a telecommunications network to select an updated local preferred route, the system comprising:
   a plurality of edge devices;
   a plurality of reflector devices;
   a traffic controller device configured to:
      receive a plurality of routing information from the plurality of edge devices of a telecommunications network, each of the plurality of routing information comprising a local preferred route for a corresponding edge device;
      generate a plurality of routing tables, each of the plurality of routing tables associated with a corresponding edge device of the plurality of edge devices and comprising the local preferred route for the corresponding edge device;
      update the local preferred route of a first routing table of the plurality of routing tables with the local preferred route of a second routing table of the plurality of routing tables; and
      transmit, via an internal border gateway protocol (iBGP) session and to the corresponding edge device associated with the first routing table, the updated local preferred route,
   wherein the local preferred route of the first routing table for the corresponding edge device comprises a first local preferred routing parameter value and the second routing table comprises a second local preferred routing parameter value larger than the first local preferred routing parameter value.

9. The system of claim 8, wherein the local preferred route is selected by a route reflector associated with a first edge device of the plurality of edge devices.

10. The system of claim 8, wherein the updated local preferred route supersedes the local preferred route.

11. The system of claim 8, wherein a subset of the plurality of edge devices is associated with a metro of the telecommunications network, the subset of the plurality of edge devices receives the local preferred route from a route reflector device.

12. The system of claim 8, wherein the plurality of routing tables are virtual routing and forwarding tables.

13. The system of claim 8, wherein a first virtual routing and forwarding table is used for advertising the updated local preferred route to a second virtual routing and forwarding table.

14. The system of claim 8, wherein the network device is a traffic control device operated by an administrator.

15. A networking device comprising:
   at least one communication port for communication with at least one computing device of a telecommunications network;
   at least one memory that stores computer-executable instructions; and
   at least one processor configured to access the at least one memory, wherein the at least one processor is configured to execute the computer-executable instructions to:
      receive a plurality of routing information from a plurality of edge devices of a network, each of the plurality of routing information comprising a local preferred route for a corresponding edge device;

generate a plurality of routing tables, each of the plurality of routing tables associated with a corresponding edge device of the plurality of edge devices and comprising the local preferred route for the corresponding edge device;

update the local preferred route of a first routing table of the plurality of routing tables with the local preferred route of a second routing table of the plurality of routing tables; and transmit, via an internal border gateway protocol session and to the corresponding edge device associated with the first routing table, the updated local preferred route, wherein the local preferred route of the first routing table for the corresponding edge device comprises a first local preferred routing parameter value and the second routing table comprises a second local preferred routing parameter value larger than the first local preferred routing parameter value.

16. The networking device of claim 15, wherein the local preferred route is selected by a route reflector associated with a first edge device of the plurality of edge devices.

17. The networking device of claim 15, wherein the updated local preferred route supersedes the local preferred route.

* * * * *